United States Patent
Trim et al.

(10) Patent No.: US 9,552,281 B2
(45) Date of Patent: Jan. 24, 2017

(54) UTILIZING A TEST AUTOMATION TOOL IN A TEST AUTOMATION ENVIRONMENT

(71) Applicant: VeriSign, Inc., Reston, VA (US)

(72) Inventors: Jeffrey Trim, Leesburg, VA (US); Hasani Jaali, Arlington, VA (US)

(73) Assignee: VERISIGN, INC., Reston, VA (US)

( * ) Notice: Subject to any disclaimer, the term of this patent is extended or adjusted under 35 U.S.C. 154(b) by 235 days.

(21) Appl. No.: 13/725,282

(22) Filed: Dec. 21, 2012

(65) Prior Publication Data

US 2013/0174125 A1 Jul. 4, 2013

Related U.S. Application Data

(60) Provisional application No. 61/581,005, filed on Dec. 28, 2011.

(51) Int. Cl.
*G06F 11/36* (2006.01)

(52) U.S. Cl.
CPC ....... *G06F 11/3664* (2013.01); *G06F 11/3672* (2013.01)

(58) Field of Classification Search
CPC .......... G06F 11/3664; G06F 11/3672
USPC ...................................... 717/124
See application file for complete search history.

(56) References Cited

U.S. PATENT DOCUMENTS

| | | |
|---|---|---|
| 6,338,082 B1 | 1/2002 | Schneider |
| 6,571,358 B1 * | 5/2003 | Culotta et al. ............. 714/33 |
| 6,678,717 B1 | 1/2004 | Schneider |
| 6,732,330 B1 | 5/2004 | Claussen et al. |
| 7,136,932 B1 | 11/2006 | Schneider |
| 7,565,402 B2 | 7/2009 | Schneider |
| 7,793,154 B2 | 9/2010 | Chagoly et al. |
| 7,823,132 B2 * | 10/2010 | Ulrich ............... G06F 11/3672 714/38.1 |
| 8,037,168 B2 | 10/2011 | Schneider |
| 8,224,994 B1 | 7/2012 | Schneider |
| RE43,690 E | 9/2012 | Schneider et al. |
| RE44,207 E | 5/2013 | Schneider |

(Continued)

OTHER PUBLICATIONS

Grogan, "JSR-223 Scripting for the Java Platform", Oct. 20, 2004, Sun Microsystems, Inc.*

(Continued)

*Primary Examiner* — Viva Miller
(74) *Attorney, Agent, or Firm* — MH2 Technology Law Group, LLP

(57) ABSTRACT

Systems and methods are disclosed for integrating JAVA objects, such as handlers, into a scripting language to be used as part of a test automation environment including a test automation tool. The environment can access and execute one or more script files coded using diverse scripting languages designed to exercise and test DNS servers, registries, and/or other network entities. The test automation tool can invoke a set of generalized handlers that may comprise compiled JAVA objects configured to perform specific testing functions. The test automation tool may load a script for a test case and a scripting language, establish a controller, and interface the script to the intermediate JAVA handlers to abstract individual script files for use in a more universal fashion, avoiding incompatibilities that can arise between various script languages.

22 Claims, 5 Drawing Sheets

(56) References Cited

U.S. PATENT DOCUMENTS

| | | | |
|---|---|---|---|
| 2002/0065903 A1* | 5/2002 | Fellman | H04L 29/12594 709/220 |
| 2002/0091999 A1* | 7/2002 | Guinart | 717/136 |
| 2002/0173943 A1* | 11/2002 | Armbruster | G06F 17/5022 703/15 |
| 2003/0126517 A1* | 7/2003 | Givoni | G06F 11/3664 714/46 |
| 2004/0003068 A1* | 1/2004 | Boldman | H04L 12/2697 709/223 |
| 2007/0299967 A1* | 12/2007 | Brady | 709/224 |
| 2008/0016233 A1 | 1/2008 | Schneider | |
| 2008/0163167 A1* | 7/2008 | Buzinov et al. | 717/115 |
| 2011/0010159 A1* | 1/2011 | Birch | G06F 11/3692 703/21 |

OTHER PUBLICATIONS

Sawyer X, "Test-DNS-0.08", Jan. 1, 2010, pp. 1-7. http://search.cpan.org/~xsawyerx/Test-DNS-0.08/lib/Test/DNS.pm, accessed May 7, 2013.

Scott Stanton, "TclBlend: Blending Tcl and Java", Feb. 1, 1998, pp. 1-8. http://www.drdobbs.com/article/print?articleId=184410486&siteSectionName=web-devlopment, accessed May 7, 2013.

Lang Jython, "Easy Way to Convert Java Code to Jyton", Dec. 30, 2004, pp. 1-2. http://osdir.com/ml/lang.jythong.user/2004-12/msg00080.html, accessed May 7, 2013.

Extended European Search Report dated May 23, 2013, EP Application N. 12199647.4, filed Dec. 28, 2012, published by European Patent Office, pp. 1-7.

A. Sundararajan, "A. Sundararajan's Weblog", last updated Oct. 21, 2009, 13 pages. http://blogs.oracle.com/sundararajan/category/Java, accessed Dec. 21, 2012.

Unknown Author, "Java Scripting Programmer's Guide", Oracle Java Technology, 1993, 2011, 7 pages. http://download.oracle.com/javase/6/docs/technotes/guides/scripting/programmer_guide/index.html, accessed Dec. 21, 2012.

Chris Broadfoot, "Groovy threads", article, Aug. 6, 2008, 3 pages. http://chrisbroadfoot.id.au/2008/08/06/groovy-threads/, accessed Dec. 21, 2012.

Chaur Wu, "Build your own scripting language for Java, an Introduction to JSR 223", JavaWorld.com, Apr. 24, 2006, 3 pages. http://www.javaworld.com/javaworld/jw-04-2006/jw-0424-scripting.html, accessed Dec. 21, 2012.

* cited by examiner

UTILIZING A TEST AUTOMATION TOOL IN A TEST AUTOMATION ENVIRONMENT

CROSS REFERENCE TO RELATED APPLICATIONS

This application claims priority to U.S. Provisional Application No. 61/581,005, filed Dec. 28, 2011, entitled "Test Automation Tool," by the same inventors herein, assigned or under obligation of assignment to the same entity as this application, and which application is incorporated herein by reference in its entirety.

FIELD

The present disclosure relates generally to tools for the automated testing of computer systems, and, particularly, to tools and platforms for automating the testing of testing domain name system resolution servers, or associated software applications.

BACKGROUND

Manual testing of software often represents a labor-intensive and time-consuming process. Automated testing tools for software applications can therefore offer a number benefits in project speed and efficiency. For example, the speed and efficiency of the automated testing of domain name server (DNS) platforms exceed those of the manual process of sending individual DNS requests and checking the validity of the returned result. Automated DNS tools therefore can execute far more test cases and produce a more complete dataset associated with discovered defects than manual approaches. A test case may for instance comprise a series of instructions for executing a specific functional test, such as to determine whether a registered domain name resolves to the correct Internet protocol address, links to a proper source file, or produces other desired results. Software applications, such as testing scripts, may be designed to perform specific test routines for DNS or other applications.

Systems used for some test cases, however, prove difficult to automate using standardized tools. For example, in many software testing environments, testing scripts may be coded using any of a wide range of programming languages. For instance, the syntax for opening a file in the scripting language "Jython" is distinct from other scripting languages, such as "Groovy." Thus, a test case calling for file manipulation may require separate coding for each scripting language used in the testing environment. In such scenarios and others, the differences between scripting languages, file formats, and other details may lead to practical issues, such as complicated syntax which must be hand-coded several times for each test case, increasing the chances of human error or coding incompatibilities.

In the operation of networks including the Internet, DNS platforms or services cooperate with a set of registries which maintain lists of registered domain names along with associated Internet protocol (IP) addresses along with a host of related information. Different registries may, however operate different support systems using a number of different protocols, and the like, and may implement upgrades and service features that are different from or incompatible with other registries. These complexities have led to considerable difficulty in attempts to thoroughly and efficiently test registries. Likewise, the ability to perform effective, automated testing of DNS resolution servers has as noted been equally problematic. It would therefore be desirable to provide tools, platforms, and techniques that are capable of efficiently testing infrastructure systems such as domain registries, DNS resolution servers, and other infrastructure systems.

SUMMARY

Disclosed implementations may include an environment including a test automation tool (TAT) to facilitate the testing of DNS servers, registries, and other network-based platforms or services. As described herein, the test automation tool can serve to abstract the tools and controls used to execute tests against DNS servers, registries, and other entities by managing the execution of various specific scripting tools, languages, or services. The test automation tool may for instance comprise an input interface, such as command line tool, and/or a graphical user interface or tool, capable of configuring various control functions associated with testing scripts and other software or services. Each test case may be coded using a distinct scripting language, yet be controlled via the test automation tool as a universal interface without a need to manually adjust all testing parameters for a given scripting language.

Systems and methods consistent with the present invention can minimize complications caused by the introduction of script-specific functions operating in various operating environments. For example, an exemplary system may integrate compiled JAVA objects into any of a variety of specific scripting languages, allowing these objects to be accessed and used as general variables within a given scripting language. Implementations of the systems and methods herein may provide software developers or others with the tools to effectively automate test cases using scripting languages, regardless of the language used to code or implement the particular testing script.

Consistent with disclosed implementations, the test automation tool may support the use of a set of handlers, which are compiled JAVA objects coded to perform specific testing functions. For example, a file handler may be used to support computer disk file operations, such as opening, closing, reading and writing files. Implementations consistent with the present invention may enable the scripting languages to import a particular handler, and to run a script using the functions provided by that handler. Multiple handlers may be imported to form a "framework" to run a complete test case.

Consistent with disclosed implementations, implementations consistent with the present invention may include a test automation tool controller for importing JAVA objects into various particular scripting languages. The test automation tool controller may create a variable in the source scripting language and load the JAVA classes from the specified JAVA object. These classes may contain object oriented methods that may be referenced in the testing scripts. The test automation tool controller, therefore, may allow the JAVA object to be imported and run from any of various scripting languages which a developer may choose to employ in the testing protocol of DNS servers, registries, and/or other platforms or services.

BRIEF DESCRIPTION OF THE DRAWINGS

The accompanying drawings, which are incorporated in and constitute a part of this specification, illustrate several implementations and, together with the description, serve to explain the disclosed principles. In the drawings.

DETAILED DESCRIPTION

Figure 1:
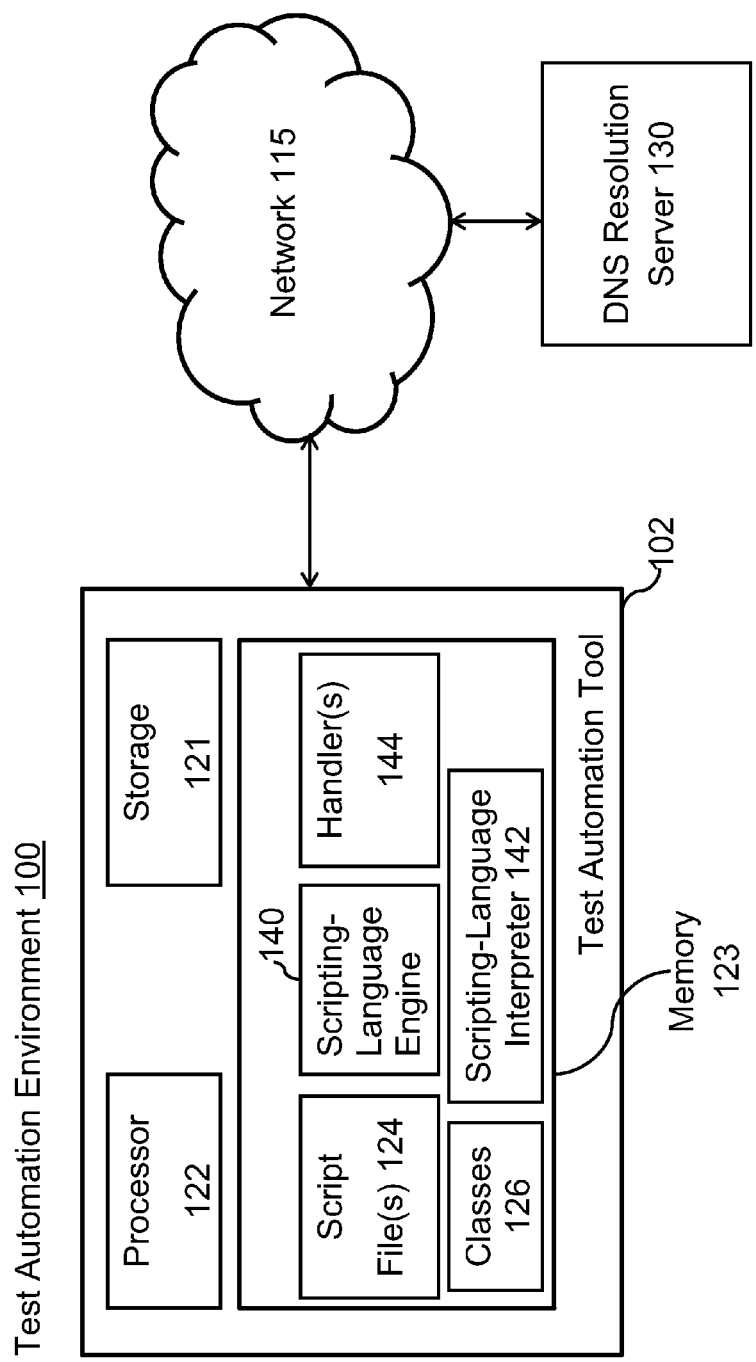
FIG. 1 is a diagram illustrating an exemplary test automation environment capable of implementing disclosed implementations, including exemplary system components.

Disclosed implementations provide an environment including a test automation tool that may allow a common set of instructions to be executed using testing scripts by invoking intermediary Java® programming language resources, regardless of the language used to implement the testing scripts. Disclosed implementations may further provide methods and systems for integrating or interfacing JAVA® programming language objects, such as handlers, into a scripting language. Those abstracted handlers may be used in executing test scripts coded using various scripting languages. The test automation tool may in implementations allow for the use of JSR-223-supported scripting languages for writing the script for test cases, under the Scripting for the Java® Platform Specification (JSR-223) standard, promulgated by the Java® Community Process organization. Scripting languages supported under JSR-223 standard include, among others, Jython™, JRuby™, Groovy™, JACL™, and JavaScript®. Disclosed implementations of the inventive platform and techniques may further be adaptable to allow for automatic testing of DNS resolution servers, using JAVA® programming language-based handlers, the aforementioned scripting languages, and other resources.

To aid in describing exemplary implementations of the present invention, an exemplary system for testing DNS resolution servers may be referred to herein. However, it will be understood that the systems and methods herein can be used in other network-based or other platforms or services. A description of how the Internet is organized may prove helpful in understanding some of the considerations surrounding the automated testing of an illustrative DNS resolution system.

The process of establishing a web site on the internet typically begins with a registrant registering a specific domain name through a registrar. The registrant may be an individual or organization that identifies a domain name, such as "example.com." The registrant contacts a registrar to process the name registration, who in turn sends the necessary domain name service information to a registry. Once the registry receives the domain name service information from the registrar, it inserts that information into a centralized database and propagates the information on the internet so that users around the world may find the domain names. The registry also provides information back to the registrar after this process is complete.

Thus, domain name registries and registrars work together to facilitate the registration of domain names. A domain registry typically maintains a master database of registered domain names, as well as their linked unique internet protocol (IP) number or address. There are an increasing number of generic top-level domains (gTLD) (e.g., .com, .edu, .biz, etc.) and country code top-level domains (ccTLD) (e.g., .us, .uk, and .tv), many of which must be registered with a second-level domain (e.g., .org.uk, .me.uk, and .co.uk) at one or more registries. Different domain registries, however, may have different data requirements for registering a domain name and may also use different protocols, channels, communication or storage formats, etc. These different requirements and protocols may introduce difficulties in providing automated testing software for DNS resolution servers.

Internet domains can be divided into groups according to their TLD suffix (e.g., .com, .net, .co.uk, etc.), with different registries responsible for each one. A single registry may be responsible for several of these groups, such as the VeriSign registry responsible for domains such as .com and .net.

After a domain name becomes registered, end-user applications may be used to find specific resources on the Internet by using the DNS resolution process. The DNS distributes the responsibility of assigning domain names and mapping those names to IP addresses by designating authoritative name servers for each domain. Authoritative name servers are assigned to be responsible for their particular domain.

DNS registries typically perform other functions related to the individual domain name registrations such as billing, renewal notifications and processing, international domain name (ION) processing, security features, and others.

Reference will now be made in detail to exemplary implementations, examples of which are illustrated in the accompanying drawings. Wherever convenient, the same reference numbers will be used throughout the drawings to refer to the same or like parts.

FIG. 1 is a diagram illustrating an exemplary automatic test environment 100 that may be used to implement disclosed implementations, including exemplary system components. The components and arrangement, however, may be varied. Automatic test environment 100 may include an automation tool 102 which can include a processor 122, a memory 123, input/output (I/O) devices (not shown), and storage 121. Automatic test environment 100 may be implemented in various ways. For example, the automation tool 102 and/or the automatic test environment 100 may be or include a general purpose computer, a server, a mainframe computer, or any combination of these computing components. In some implementations, automatic test environment 100 may include a cluster of computing systems. The automation tool 102 and/or automatic test environment 100 can likewise, in cases, be implemented as one or more software applications, services, and/or in cloud-based networks.

Elements in the automatic test environment 100 may communicate over one or more communications links with network 115. For example, each link may be a wired, optical, or wireless communication link, such as for instance a LAN, a WAN, or other suitable connection. Network 115 may be or include the Internet, and may allow the automatic test environment 100 to access one or more DNS resolution servers 130. Automatic test environment 100 may be a standalone platform or it may be part of a subsystem, which may, in turn, be part of a larger system or service.

Processor 122 may include one or more processing devices, such as a microprocessor from the various families manufactured by Intel™, AMD™, Sun Microsystems, and/or others. Memory 123 may include one or more storage devices configured to store information used by processor 122 to perform certain functions related to disclosed implementations. Storage 121 may include a volatile or non-volatile, magnetic, semiconductor, tape, optical, removable, non-removable, or other type of storage device or computer-readable medium. In certain implementations, memory 123 may include one or more script files 124, one or more handlers 144 and/or classes 126 loaded from storage 121 or elsewhere that, when executed by automatic test environment 100, perform various procedures, operations, or processes consistent with disclosed implementations. Script files 124 may include or make reference to one or more handlers 144 and/or classes 126.

Methods, systems, and articles of manufacture consistent with disclosed implementations are not limited to separate programs or computers configured to perform dedicated tasks. For example, memory 123 may be configured with a script file 124 that performs several functions when executed by processor 122. For example, script file 124 can be or include a single process, file, thread, or set of instructions that contains instructions to perform the functions of a DNS resolution server testing system. In implementations, script file 124 can in cases comprise or contain multiple test scripts, files, processes, threads, and/or sets of instructions, or the test automation environment 100 can load, access, and/or execute multiple different ones of a script file 124. When multiple script files are loaded, accessed, and/or executed, those files can be accessed and/or executed one after the other, or may be loaded, accessed, and/or executed at the same time, overlapping, or otherwise concurrent times. When more than one script file 124 is executed, those files can be configured to share data by serializing and deserializing lists of data generated during the testing process. Moreover, one or more script file 124 and/or other software may be executed remotely from automatic test environment 100. For example, automation tool 102 may access one or more remote programs and/or services that via a cloud-based network that, when executed, perform functions related to implementations herein.

Memory 123 may be also be configured with an operating system (not shown) that performs functions known in the art when executed by the automation tool 102. By way of example, the operating system may be Microsoft Windows™, Unix™, Linux™, Solaris™, or others. In implementations, the automation tool 102 may instead not employ or interact with an operating system.

Automation tool 102 may include one or more input/output (I/O) devices (not shown) that allow data to be received and/or transmitted by that tool and/or the automatic test environment 100. I/O devices may also include one or more digital and/or analog communication input/output devices that allow automatic test environment 100 to communicate directly with programmers or with other machines and devices. In other implementations, software may provide requests and receive information through the I/O devices of system 100. Automatic testing environment 100 may receive data from external machines and devices and output data to external machines and devices via I/O devices. The configuration and number of input and/or output devices incorporated in I/O devices may vary for certain implementations.

Figure 2:
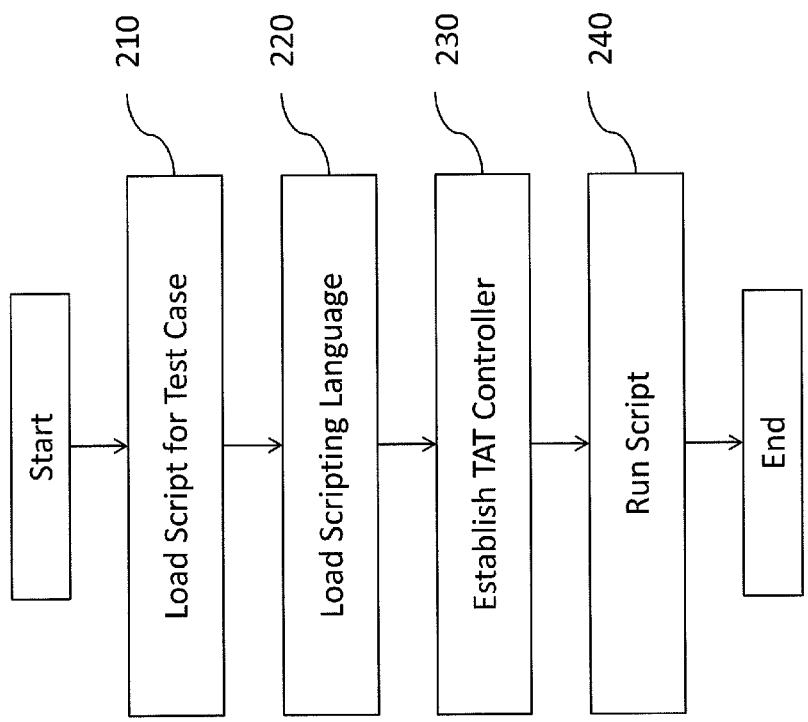
FIG. 2 is a flow diagram illustrating exemplary processes for: loading a test case and scripting language; establishing a test automation tool controller; and running a script, consistent with disclosed implementations.

FIG. 2 is a flow diagram illustrating an exemplary processes for loading a test case and scripting language, establishing a testing automation controller, and running a script, consistent with implementations. In 210 of FIG. 2, a script file 124 containing one or more test cases may be loaded. A test case may include the steps, calls, routines, data or data references, and/or other resources required to run a specific test against a sub-system or product, such as a DNS server or service. A script file 124 containing one or more test cases may be coded using one or more scripting languages, including JSR-223-supported scripting languages such as Jython™, JRuby™, Groovy™, JACL™, and JavaScript®. Once a script file 124 containing one or more test cases has been loaded, one or more scripting language environments may be loaded in 220. It will be appreciated that other types or classes of scripting languages can be used. A scripting language environment may be understood to include a "script syntax" or a "script execution environment" that is well-defined, documented, and/or understood across the computing industry. The selection of a particular scripting language may depend on the one or more languages used in coding a script for a test case.

In 230 of FIG. 2, an automation tool 102 may be established. The automation tool 102 may as noted be or include a command line tool capable of initiating various control functions, such as loading classes, reading scripts, executing scripts, and putting scripts to sleep. The automation tool 102 may allow for test cases to be coded using JSR-223-supported scripting languages. The automation tool 102 may for instance also allow for passing variables from a command line to a test script containing one or more test cases. For example, a variable may be defined on the command line, and the value that has been assigned to the variable may be passed into the test script file 124 or processes executing from that file. Such variables may include script variables or objects, which are for example discussed in Step 340 of FIG. 3, below. In 240, the automation tool 102 may initiate the execution of a script that has been loaded.

Figure 3:
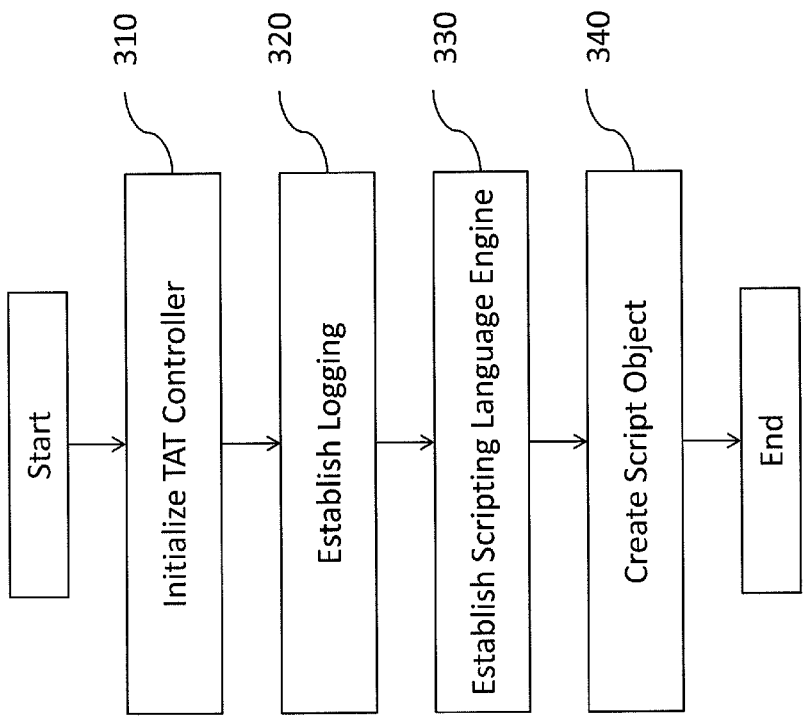
FIG. 3 is a flow diagram illustrating exemplary processes for initializing a test automation tool controller and preparing for the execution of a test case included in a script file, consistent with disclosed implementations.

FIG. 3 is a flow diagram illustrating exemplary processes for initializing an automation tool 102 and preparing for the execution of a test case included in a script file 124, consistent with disclosed implementations. Further to 230 of FIG. 2, the automation tool 102 may be initialized in 310 of FIG. 3. Initializing the automation tool 102 may include assigning values to variables and loading required classes. Next, the automation tool 102 may establish logging in 320. The purpose of logging may be to record the series of instructions performed during the execution of a test case. Logging may be used to support the output of the automation tool 102 by, for example, reporting the instructions and results of the test script. Additional detail regarding the output of the automation tool 102 may be provided in the flow diagram illustrated in FIG. 4. The automation tool 102 may proceed to establish a scripting-language engine 140 in 330. The scripting-language engine 140 may be used to select a scripting language for the test case, and it may be established using a JSR-223-supported scripting language. For example, the scripting-language engine 140 may select Jython or Groovy as a scripting language to use for the test case. Finally, in 340, the automation tool 102 may create a script object or variable that can be used in the same way as any other variable or syntax in a test case script. The script object may contain object-oriented methods which may be individually called to perform actions on computer disk files, such as opening and closing files. The script object may also be defined as a pointer to the automation tool 102 object. The script object may further be used to register handlers.

Figure 4:
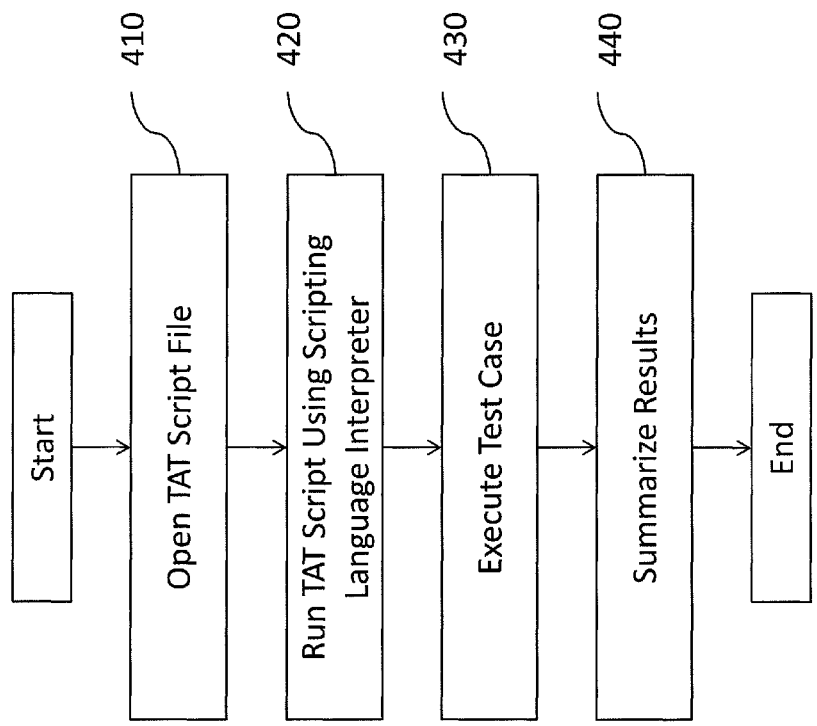
FIG. 4 is a flow diagram illustrating exemplary processes for running a script file and executing a test case included in the script, consistent with disclosed implementations.

FIG. 4 is a flow diagram illustrating an exemplary processes for running a script file 124 and executing a test case included in the script, consistent with disclosed implementations. Further to 240 of FIG. 2, a script file 124 may be opened in 410 of FIG. 4. The script file may be loaded into a memory (not depicted in FIG. 4) containing one or more script files. Once a script file 124 has been opened, the script can be run using a scripting language interpreter 142 in 420. The scripting language interpreter 142 may be capable of running a script file 124 written in a language that is supported by the automation tool 102. The scripting language interpreter 142 may be capable of running a script based on the scripting language selected by the scripting-language engine, as may be described in the flow diagram in FIG. 3. Next, a test case may be executed in 430. Additional details regarding test script execution may be provided in the flow diagram illustrated in FIG. 5. Once execution of a test case is complete, a summary of the execution results may be compiled, stored, and/or output in 440. The output of the automation tool 102 may be used to determine whether the test case was executed correctly. For instance, the logging feature of the automation tool 102 may provide part of the output of the automation tool 102 by, for example, reporting the instructions and results of the test script.

Figure 5:
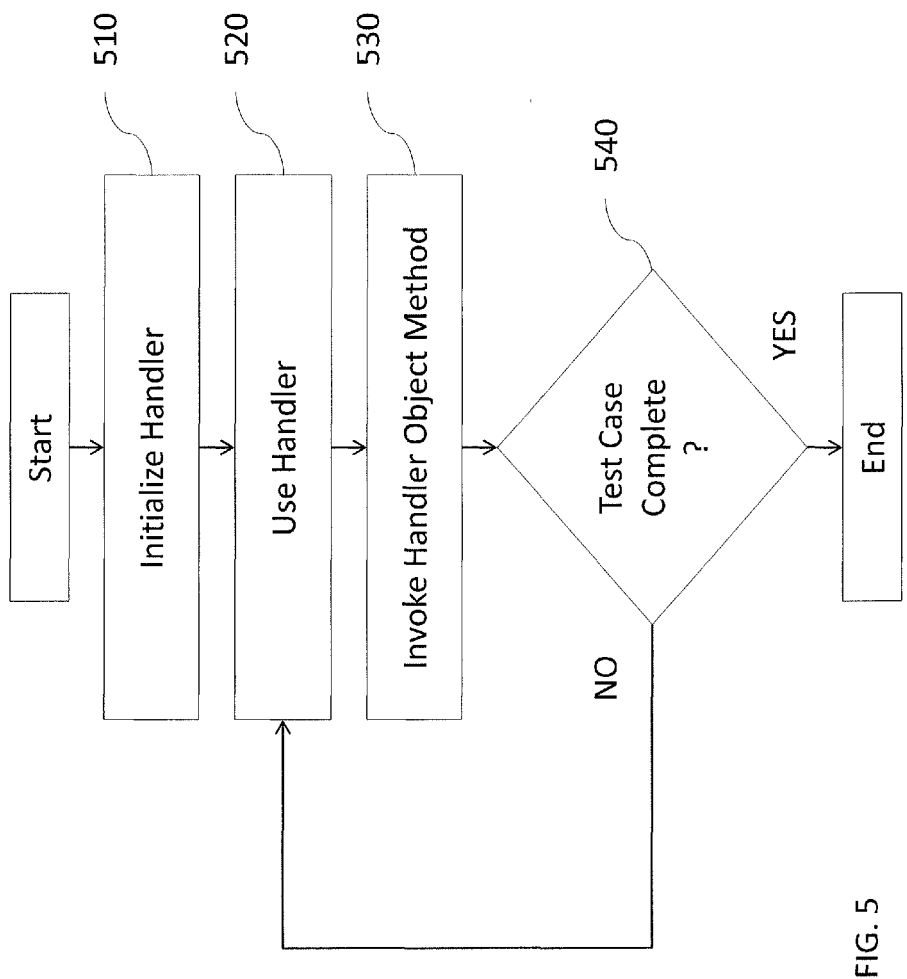
FIG. 5 is a flow diagram illustrating exemplary processes for using a handler and handler object methods during execution of a test script, consistent with disclosed implementations.

FIG. 5 is a flow diagram illustrating exemplary processes for using one or more handlers 144 and associated handler object methods during execution of a script file 124, consistent with disclosed implementations. One or more handlers 144 may be or include a compiled JAVA object containing programming code for performing specific testing functions. For example, a "File" handler may be used to support computer disk file operations, such as opening, closing, reading, writing, and transmitting files. Each JSR-223 scripting language for instance can import one or more handlers 144 and use the functions of that handler in a test case.

Further to 430 of FIG. 4, one or more handlers 144 may be initialized in 510 of FIG. 5. Initializing one or more handlers 144 may include establishing the handler object context and/or loading the required classes. The handler object context may be established when the test script indicates that the handler will be used. The one or more handlers 144 may remain "in scope" during the execution of the script file 124. Once the one or more handlers 144 have been initialized, it may be used during execution of a test case in 520. A test case may call for the use of one or more handlers 144. For example, separate handlers that perform file operations, communication, and/or messaging services may need to be used in a given test case. The one or more handlers 144 may also enable searching for one or more tags in the expected output of the execution of a test case. Next, a handler object method may be invoked in 530, which may involve calling corresponding methods for performing specific testing functions that are contained within or executed by the one or more handlers 144. A test case may require the use of one or more handler object methods from one or more handlers 144. Examples of specific testing functions are noted below. After the handler object method is performed, automatic test environment 100 may determine whether execution of the test case is complete in 540. If the test case is not yet complete, the handler may be further used during execution of the test case. Once a test case is complete, the handler context may go out of scope, or otherwise suspend or terminate. In implementations, the scripting language interpreter 142 and/or one or more handlers 144 can include logic to flush out old or pending data that is obsolete.

Various types of handlers 144 may be used in the automatic test environment 100 for executing script files 124. First, there "File" handler can be utilized which is capable of performing operations on disk files, directories, and/or other data objects or structures. The File handler may contain object methods to open, read, write, close, seek and delete files and directories. In addition, a Domain Information Groper ("DIG") handler can be invoked to perform DNS resolution queries against a DNS server. This class of handler may perform a similar function as the DIG Unix command, which provides a query based on a name server input. For example, as shown by the sample code provided below, a DIG handler can query DNS resolution for information surrounding the domain name expression "www.google.com:"

Example 1

```
***************************************************************
#Load required classes
vrsn.loadCiass("dig", "com.verisign.tat.handler.DIG")
#Query DNS
result = dig.query( ["www.google.com", "A"] )
print dig.getlastReceived( )
***************************************************************
```

The execution of the foregoing handler can result in the following output:

Example 2

```
;; ->>HEADER<<- opcode: QUERY, status: NOERROR, id: 46791
;; flags: qr rd ra ; qd: 1 an: 6 au: 0 ad: 0
;; QUESTIONS:
;; www.google.com., type= A, class= IN
;;       ANSWERS:
www.google.com.        30381  IN    CNAME   www.l.google.com
www.google.com.               IN    A       72.14.204.103
134 www.l.google.com.         IN    A       72.14.204.104
134 www.l.google.com          IN    A       72.14.204.105
134 www.l.google.com          IN    A       72.14.204.147
134 www.l.google.com          IN    A       72.14.204.99
;; AUTHORITY RECORDS:
;; ADDITIONAL RECORDS:
;; Message size: 132 bytes
;; SERVER: /10.170.12.56:53
;; Query time: 15 msec
***************************************************************
```

An Extensible Provisioning Protocol ("EPP") handler as another type or class of one or more handlers 144 may access an EPP server by using a Secure Sockets Layer ("SSL") to send an encrypted stream of commands. The handler operations may be actual EPP commands, allowing the tester to register and work with domain names and name servers in a registry system (such as the VeriSign DNS Registry System). An Oracle handler may for further example simplify access to an Oracle database. This handler may contain object methods to issue SQL, call stored procedures, and process results returned from an Oracle database. Similarly, a MYSQL handler may simplify access to a MYSQL database. This handler may contain object methods to issue SQL, call stored procedures, and process results returned from a MYSQL database. Other handlers consistent with implementations of the present invention include a message client handler capable of connecting, sending and receiving messages. A SNMP (Simple Network Control Protocol) handler that is configured to parse SNMP request messages and format and build proper SNMP response messages can likewise be invoked. Other classes, types, or configurations of handler can be employed in the one or more handlers 144 and associated processes in the automatic test environment 100. By invoking the one or more handlers 144 and interacting with the scripting language interpreter 142 and other logic, the automatic test environment 100 can read a set of test cases which have been coded in various scripting languages in the script file 124, yet perform DNS server, registry, or other testing operations in a seamless manner.

The foregoing descriptions have been presented for purposes of illustration and description. Modifications and variations are possible in light of the above teachings or may be acquired by persons skilled in the art. For example, the described implementation includes software, but the disclosed implementations may be implemented as a combination of hardware, software, firmware, services, logic, and/or other resources. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM. Various programs, program modules, or logic described herein can be created using any of the techniques known to one skilled in the art or can be designed in connection with existing software. For example, program sections or program modules can be designed in or by means of .Net® Framework, .Net® Compact Framework (and related languages, such as Visual Basic® programming language, C® programming language, etc.), Python programming language, PHP® programming language, XML® markup language, Java® programming language, C++® programming language, JavaScript® scripting language, HTML® markup language, HTML/AJAX™ web development techniques, Flex® application framework, Silverlight® application framework, or any other now known or later created programming language. One or more of such software sections or modules can be integrated into a computer system or existing browser software.

Other implementations will be apparent to those skilled in the art from consideration of the specification and practice of the implementations disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims.

What is claimed is:

1. A method of providing a test environment, comprising:
accessing, via the test environment, a plurality of script files, in a plurality of scripting languages, coded to perform a set of test operations, wherein the plurality of script files are accessed concurrently;
invoking a set of object-oriented handlers based on the set of test operations contained in the plurality of script files, wherein invoking the set of object-oriented handlers comprises:
loading each scripting language of the plurality of scripting languages;
interfacing an object-oriented handler of the set of object-oriented handlers into each scripting language of the plurality of scripting languages, wherein interfacing the object-oriented handler of the set of object-oriented handlers into each scripting language of the plurality of scripting languages comprises creating a variable in the scripting language and loading a class from the object-oriented handler;
bringing each object-oriented handler of the set of object-oriented handlers in scope;
establishing a handler object context for each object-oriented handler of the set of object-oriented handlers; and
loading classes required by one or more of the set of object-oriented handlers;
initiating the set of test operations using the set of object-oriented handlers;
determining that the set of test operations are complete; and
bringing each object-oriented handler of the set of object-oriented handlers out of scope by suspending each object-oriented handler in response to determining that the set of test operations are complete.

2. The method of claim 1, wherein the set of test operations comprises a set of automated tests of a domain name server.

3. The method of claim 2, wherein the set of automated tests of the domain name server comprises at least one of—
testing an availability of a domain name,
retrieving a set of metadata associated with the domain name, or
performing an access of a Web site associated with the domain name.

4. The method of claim 1, wherein the set of test operations comprises a set of automated tests of a domain name registry.

5. The method of claim 1, wherein the plurality of script files comprise a script file encoded in a JSR-223 scripting language.

6. The method of claim 5, wherein the JSR-223 scripting language comprises at least one of Jython™, JRuby™, Groovy™, JACL™, and JavaScript® scripting languages.

7. The method of claim 1, wherein the set of object-oriented handlers comprises a set of Java® programming language-based handler objects.

8. The method of claim 7, wherein the set of Java® programming language-based handler objects comprises at least one of—
a file handler object,
a script sleep handler object,
a script awaken handler object,
a database handler object,
a domain information groper (DIG) handler, or
a communications handler object.

9. The method of claim 1, further comprising providing an input interface to receive input from a user to manage the set of test operations.

10. The method of claim 9, wherein the input interface comprises at least one of a command line interface or a graphical user interface.

11. The method of claim 1, wherein the set of test operations comprises a complete test case for a target network entity.

12. A system, comprising:
an interface to a data store storing at least one script file; and
a processor, communicating with the data store via the interface, the processor being configured to—
access, via a test environment, a plurality of script files, in a plurality of scripting languages, coded to perform a set of test operations, wherein the plurality of script files are accessed concurrently;

invoke a set of object-oriented handlers based on the set of test operations contained in the plurality of script files, wherein invoking the set of object-oriented handlers comprises:

loading each scripting language of the plurality of scripting languages;

interfacing an object-oriented handler of the set of object-oriented handlers into each scripting language of the plurality of scripting languages, wherein interfacing the object-oriented handler of the set of object-oriented handlers into each scripting language of the plurality of scripting languages comprises creating a variable in the scripting language and loading a class from the object-oriented handler;

bringing each object-oriented handler of the set of object-oriented handlers in scope;

establishing a handler object context for each object-oriented handler of the set of object-oriented handlers; and loading classes required by one or more of the set of object-oriented handlers;

initiate the set of test operations using the set of object-oriented handlers;

determine that the set of test operations are complete; and bring each object-oriented handler of the set of object-oriented handlers out of scope by suspending each object-oriented handler in response to determining that the set of test operations are complete.

13. The system of claim 12, wherein the set of test operations comprises a set of automated tests of a domain name server.

14. The system of claim 13, wherein the set of automated tests of the domain name server comprises at least one of— testing an availability of a domain name, retrieving a set of metadata associated with the domain name, or performing an access of a Web site associated with the domain name.

15. The system of claim 12, wherein the set of test operations comprises a set of automated tests of a domain name registry.

16. The system of claim 12, wherein the plurality of script files comprise a script file encoded in a JSR-223 scripting language.

17. The system of claim 16, wherein the JSR-223 scripting language comprises at least one of Jython™, JRuby™, Groovy™, JACL™, and JavaScript® scripting languages.

18. The system of claim 12, wherein the set of object-oriented handlers comprises a set of Java® programming language-based handler objects.

19. The system of claim 18, wherein the set of Java® programming language-based handler objects comprises at least one of— a file handler object, a script sleep handler object, a script awaken handler object, a database handler object, a domain information groper (DIG) handler, or a communications handler object.

20. The system of claim 12, wherein the processor is further configured to provide an input interface to receive input from a user to manage the set of test operations.

21. The system of claim 20, wherein the input interface comprises at least one of a command line interface or a graphical user interface.

22. The system of claim 12, wherein the set of test operations comprises a complete test case for a target network entity.

* * * * *